United States Patent [19]
Dimolitsas et al.

[11] Patent Number: 5,488,653
[45] Date of Patent: Jan. 30, 1996

[54] FACSIMILE INTERFACE UNIT (FIU) ENHANCED CAPABILITIES NEGOTIATION

[75] Inventors: Spiros Dimolitsas, Gaithersburg; Michael Onufry, Jr., Clarksburg; Jack H. Rieser, Middletown, all of Md.

[73] Assignee: Comsat Corporation, Bethesda, Md.

[21] Appl. No.: 935,787

[22] Filed: Aug. 27, 1992

Related U.S. Application Data

[63] Continuation-in-part of Ser. No. 754,785, Sep. 4, 1991.

[51] Int. Cl.⁶ .................................................. H04M 11/00
[52] U.S. Cl. ........................................... 379/100; 379/98
[58] Field of Search ........................ 358/434, 435, 358/436, 438, 442, 407, 445, 468, 404; 379/100, 94, 58, 59; 341/63, 53; 455/12.1; 375/8

[56] References Cited

U.S. PATENT DOCUMENTS

| | | | |
|---|---|---|---|
| 4,558,369 | 12/1983 | Shinohara | 358/257 |
| 4,635,255 | 6/1985 | Clark | 370/110 |
| 4,837,812 | 6/1989 | Takahashi | 379/98 |
| 4,927,546 | 5/1990 | Takahashi | 435/74 |
| 4,941,170 | 7/1990 | Herkt | 379/100 |
| 4,972,457 | 11/1990 | O'Sullivan | 379/59 |
| 4,991,197 | 2/1991 | Morris | 379/58 |
| 5,050,005 | 5/1989 | Kagami | 358/434 |
| 5,127,041 | 6/1992 | O'Sullivan | 379/59 |
| 5,142,568 | 10/1990 | Ogata | 379/100 |
| 5,173,933 | 12/1992 | Jabs | 379/58 |
| 5,282,238 | 1/1994 | Berland | 379/58 |
| 5,297,196 | 3/1994 | Yamada | 379/99 |
| 5,404,394 | 4/1995 | Dimolitsas | 379/100 |

Primary Examiner—Sandra O'Shea
Assistant Examiner—John Ning
Attorney, Agent, or Firm—Sughrue, Mion, Zinn, Macpeak & Seas

[57] ABSTRACT

An apparatus for and a method of permitting the in-band negotiation of enhanced capabilities between two or more facsimile interface units (FIUs) by using FIU capabilities control packets containing a plurality of data cells carrying information of the capability negotiation information is disclosed. In operation, a called station identification signal is transmitted from a remodulating FIU together with a special capabilities packet following the end of a line control packet. The calling FIU may issue a response agreeing to or modifying the compatible enhancements by sending its own special capabilities control packet containing compatibility negotiation information. In another aspect of the present invention, an FIU adds a set of data cells to a line control packet to minimize the possibility of data cell alignment due to degraded channel conditions. In accordance with the present invention, a unique word is selected and transmitted in the set of data cells so as to enhance the system performance and protocol tracking capability of the receiving FIU.

9 Claims, 5 Drawing Sheets

USE OF LINE CONTROL PACKET IN THE DATA CHANNEL SHOWN IN FIG.1

USE OF SPECIAL CONTROL PACKET IN THE DIGITAL CHANNEL SHOWN IN FIG.3

FACSIMILE INTERFACE UNIT (FIU) ENHANCED CAPABILITIES NEGOTIATION

This application is a continuation-in-part of U.S. application Ser. No. 07/754,785, entitled, "LINE STATE TRANSMISSION SYSTEM OVER DIGITAL CHANNELS FOR GROUP 3 FACSIMILE," filed Sep. 4, 1991.

FIELD OF THE INVENTION

The present invention is directed to the field of facsimile signal transmission. More specifically, the present invention is directed to the in-band negotiation of enhanced capabilities between linked facsimile interface units (FIUs). Furthermore, the present invention is directed to enhancing data alignment between FIUs under degraded channel conditions.

BACKGROUND OF THE INVENTION

The Consultative Committee on International Telegraph and Telephone (CCITT) sets international telecommunications definitions and standards for four categories of facsimile equipment (Groups 1, 2, 3 and 4). Most recently, Group 3 (G3) facsimile equipment have become popular because they enable a document page to be transmitted by a digital modem over a telephone-type circuit in one minute or less by employing digital-data-compression techniques. Detailed standards for G3 equipment are found in recommendations T.4 and T.30 of CCITT.

A typical facsimile transmission is shown in FIG. 1, wherein a transmitting facsimile machine 1 includes a scanner 1a for scanning a document and for providing information representing the scanned document at a rate which is equal to or less than 9.6 kbit/s, i.e., scanner 1a outputs baseband data. The facsimile machine 1 further includes a modem 1b which receives the baseband data output from the scanner 1a and which functions to convert the baseband data to analogue voiceband data. Specifically, modem 1b serves to convert and shift the spectrum of the digital baseband upwards in frequency so as to output analogue voiceband data which is carried by analogue communication line 6 to the digital circuit multiplication equipment (DCME) transmitter device 3 via analogue-to-digital (A/D) converter 3a. The DCME transmitter 3 transmits digital voiceband data at rates of 16, 24, or 32 kbit/s signals carrying voice traffic, or 40 kbit/s carrying non-voice or data traffic, e.g., facsimile data. The digital voiceband link may be a digital satellite or terrestrial cable communication line for connecting the DCME transmitter 3 and the DCME receiver 4.

The DCME receiver 4 and facsimile machine 2 perform the reverse operations of DCME transmitter 3 and facsimile machine 1, respectively. Specifically, digital facsimile data received by receiver 4 is converted into analogue facsimile data via D/A converter 4a for input to facsimile machine 2. The facsimile machine 2 includes a modem 2a which shifts the spectrum downward and converts and data to 9.6 kbit/s baseband data or less for input to a printer 2b which reproduces the document originally scanned in scanner 1a of facsimile machine 1.

As discussed in U.S. application Ser. No. 07/720,990, entitled "FACSIMILE COMMUNICATION SYSTEM," filed Jun. 26, 1991, which is expressly incorporated herein by reference, facsimile transmissions have been used effectively in mobile communication systems wherein the DCME 3 of FIG. 1 is replaced by a mobile telephone switching office (MTSO) or a fixed earth station (FES), and the DCME 4 is replaced by a mobile terminal (MT) or a mobile earth station (MES) (as shown in FIG. 2). In the figure, the system 50 includes two facsimile machines 52 and 54, two FIUs 56 and 58, and a digital transmission channel 60 for connecting the two FIUs 56 and 58. For facsimile messages originating from facsimile machine 52, FIU 56 is the demodulating FIU for converting the analogue voiceband data to digital baseband data, FIU 58 is the remodulating FIU for converting the digital baseband data to analog voiceband data, and facsimile machine 54 is the receiving facsimile machine. The digital channel 60 is composed of a single 10.5 kbit/s channel, i.e., a channel having much lower band width than that used by a DCME.

By transmitting G3 facsimile signals over digital channels in their baseband, as in the systems described above, substantial transmission gain and quality enhancement advantages can be attained. The advantages are attributed to the fact that using digital channels reduces the analogue links required. However, the above systems often require additional out-of-band transmission capacity that is used to carry information concerning the type of traffic (called "line state information").

U.S. Application Ser. No. 07/754,785, entitled "LINE STATE TRANSMISSION SYSTEM OVER DIGITAL CHANNELS FOR GROUP 3 FACSIMILE," filed Sep. 4, 1991, improves upon the above systems by providing a facsimile communication system which permits line state information to be transmitted in-band together with user-data without the need for additional out-of-band transmission capacity. In particular, signals used for link equalization (e.g., training and synchronization) can be regenerated by the modulating FIU when signaled to do so by the demodulating FIU. In this manner, not all of the signals need to be transmitted over the digital channel. To permit the selection of a suitable modulator and/or the precise timing for the regeneration of link equalizing signals, the demodulating FIU must generate appropriate control signals and transmit these control signals to the modulating FIU in order to convey the line state (LS) changes and their corresponding timing relationships.

For example, as shown in FIG. 3, initial idle line state information I is being transmitted over the digital channel by a sending FIU such as FIU 56 (FIG. 2). The sending FIU 56 then detects a line state transition at time T1 (i.e., a transition from the idle state to a synchronization state). Upon this detection, the sending FIU 56 assembles a digital line control packet 30A having preamble P and S synchronizing signal connection line transition code SSC. After this line control packet is transmitted to the remodulating FIU, the synchronizing data S is transmitted over the digital channel. This data S continues to be sent over the digital channel until time T2 at which time another transition is detected by the demodulating FIU (i.e., a transition from the synchronization state to a training state TCF). By transmitting the line control packet in-band, the control signals used out-of-band in the previously described systems are no longer needed.

A number of mobile systems, including the European digital mobile radio, the International Maritime Satellite organization (INMARSAT) standard-B and standard-M, the aeronautical INMARSAT, and the AUSSAT facsimile standards, employ FIUs to provide the necessary voiceband-to-baseband and T.30-to-satellite protocol conversions. As at least one of these systems (INMARSAT-M) is known to have link budgets which have been miscalculated, and therefore backward compatible enhancements to the current system specifications will be necessary. Although alternative devices for use as facsimile interface units may be designed, these devices may not enhance the capabilities of the systems while maintaining backward compatibility with the existing communications system specifications such as those for the INMARSAT system, or they may not be capable of further enhancements.

SUMMARY

It is therefore an object of the present invention to provide a facsimile communication system which permits facsimile interface units (FIUs) to negotiate in-band enhanced capabilities while providing backward compatibility with the existing communications system specifications such as those for INMARSAT and the like.

It is another object of the present invention to provide a facsimile communication system in which a unique word code is used to enhance the communications system performance and control signal and protocol tracking capability of systems such as INMARSAT-M, even in the presence of digital channel impairments.

It is yet another object of the present invention to provide a facsimile communication system which is directly applicable to other digital facsimile communication systems, such as the AMSC/TMI system.

The above and other objects and advantages of the present invention are accomplished by providing an apparatus for and a method of permitting the in-band negotiation of enhanced capabilities between two or more FIUs by using "FIU capabilities control packets" containing a plurality of data cells carrying information of each FIU's capability. In operation, a called station identification signal is transmitted from a called FIU together with a special capabilities packet during a period in which no facsimile data is transmitted over the digital channel. The calling FIU may issue a response agreeing to or modifying the compatible enhancements by sending its own special capabilities control packet containing compatibility negotiation information. As this negotiation process takes place in-band prior to transmission of facsimile data, no additional channel capacity is required.

In another aspect of the present invention, an FIU adds a set of data cells to a line control packet to minimize the possibility of data cell alignment due to degraded channel conditions. In accordance with the present invention, a unique word is selected and transmitted in the set of data cells so as to enhance the system performance and protocol tracking capability of the receiving FIU.

BRIEF DESCRIPTION OF THE DRAWINGS

The preferred embodiment will be described in detail with reference to the appended drawings in which.

DESCRIPTION OF THE PREFERRED EMBODIMENT

It should be noted that reference made herein to a satellite channel should be taken as merely illustrative of the present invention. The techniques described herein are general and can be applied to other types of channels, such as terrestrial cable or cellular, as long as facsimile signals are demodulated by facsimile interface units (FIUs) and transmitted to distant locations in a baseband digital format.

As described above, FIUs are typically installed in fixed earth stations (FESs) and mobile earth terminals (METs) which communicate with each other by a digital communications channel established in the facsimile data mode. These units enable a terrestrial user's Consultive Committee on International Telephone and Telegraph (CCITT) category Group 3 facsimile terminal equipment (FTE) to be interconnected with an MET user's Group 3 FTE (or between two MET users) via a digital satellite system. Conventional telephone circuits are used between the terrestrial Public Service Telephone Network (PSTN) end-user and the FES, while the satellite system completes the connection to the mobile end-user to permit real-time communication between the Group 3 standard facsimile terminals.

Figure 4:
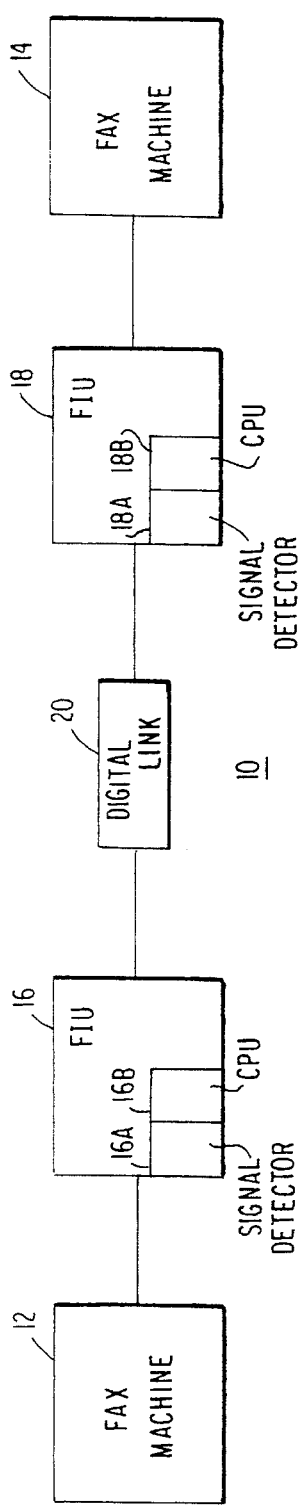
FIG. 4 is a block diagram of a facsimile communication system in accordance with the present invention.

FIG. 4 shows a communication system which is applicable to the present invention. The communication system 10 includes two facsimile machines 12 and 14, two FIUs 16 and 18, and a digital transmission channel 20 for connecting the two FIUs. The FIUs 16 and 18 include signal detector units 16A and 18A, respectively. The FIUs 16 and 18 also include CPLIs 16B and 18B, respectively. The signal detectors 16A, 18A serve to detect incoming signals from their respective facsimile machines 12 and 14, and to identify corresponding line state data. The CPUs 16B and 18B serve to assemble/disassemble the identified data into digital packet form.

For example, if facsimile machine 12 is transmitting facsimile messages, then FIU 16 serves to intercept and demodulate the facsimile signals from facsimile machine 12 and, once demodulated, to transmit these signals in digital form over the digital baseband channel 20. In this example, FIU 16 would be defined as the demodulating FIU. At the other end of the digital link 20, the FIU 18 would be defined as the "modulating FIU" since it receives the digital baseband signals transmitted over link 20, and converts these digital signals into an analog voiceband format by selection of a suitable modulating method.

The FIUs further consist of elements (not shown) including telephone tone generators and detectors; CCITT V.21 modulators and demodulators; CCITT V.27 ter modulators and demodulators; and control logic circuits for baseband message formatting, facsimile process control, facsimile protocol conversion, call establishment, call control, and call clearing.

Figure 1:
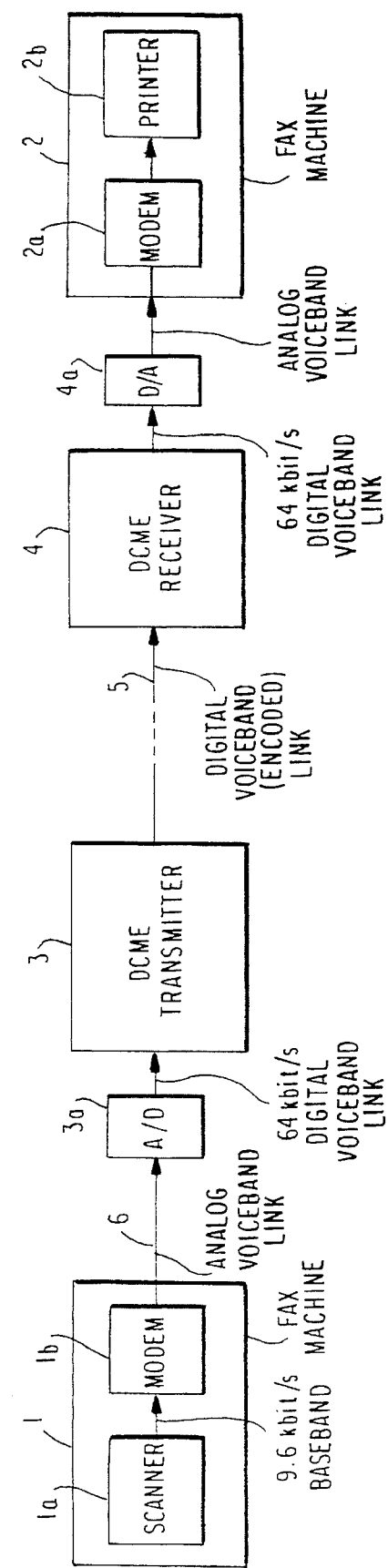
FIG. 1 is a block diagram of a conventional facsimile communication system employing DCME circuits.
Figure 2:
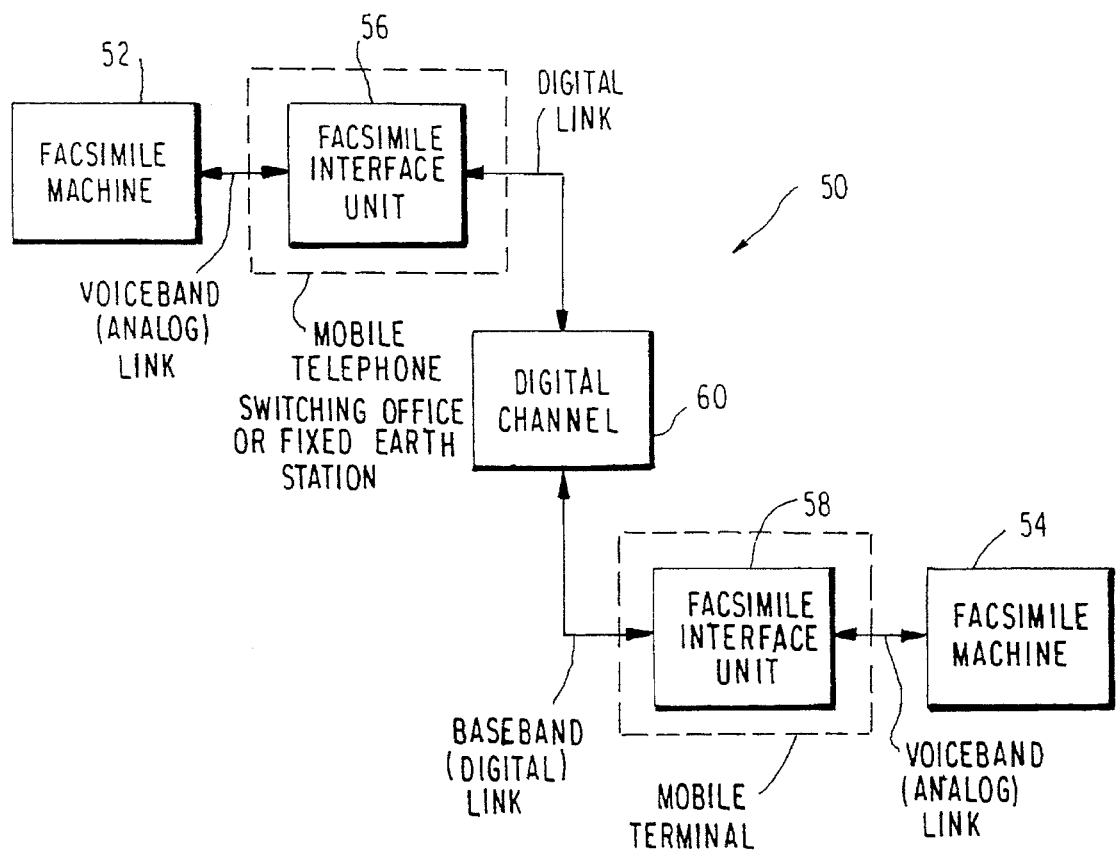
FIG. 2 is a block diagram of a known facsimile system employing facsimile interface units (FIUs)
Figure 3:
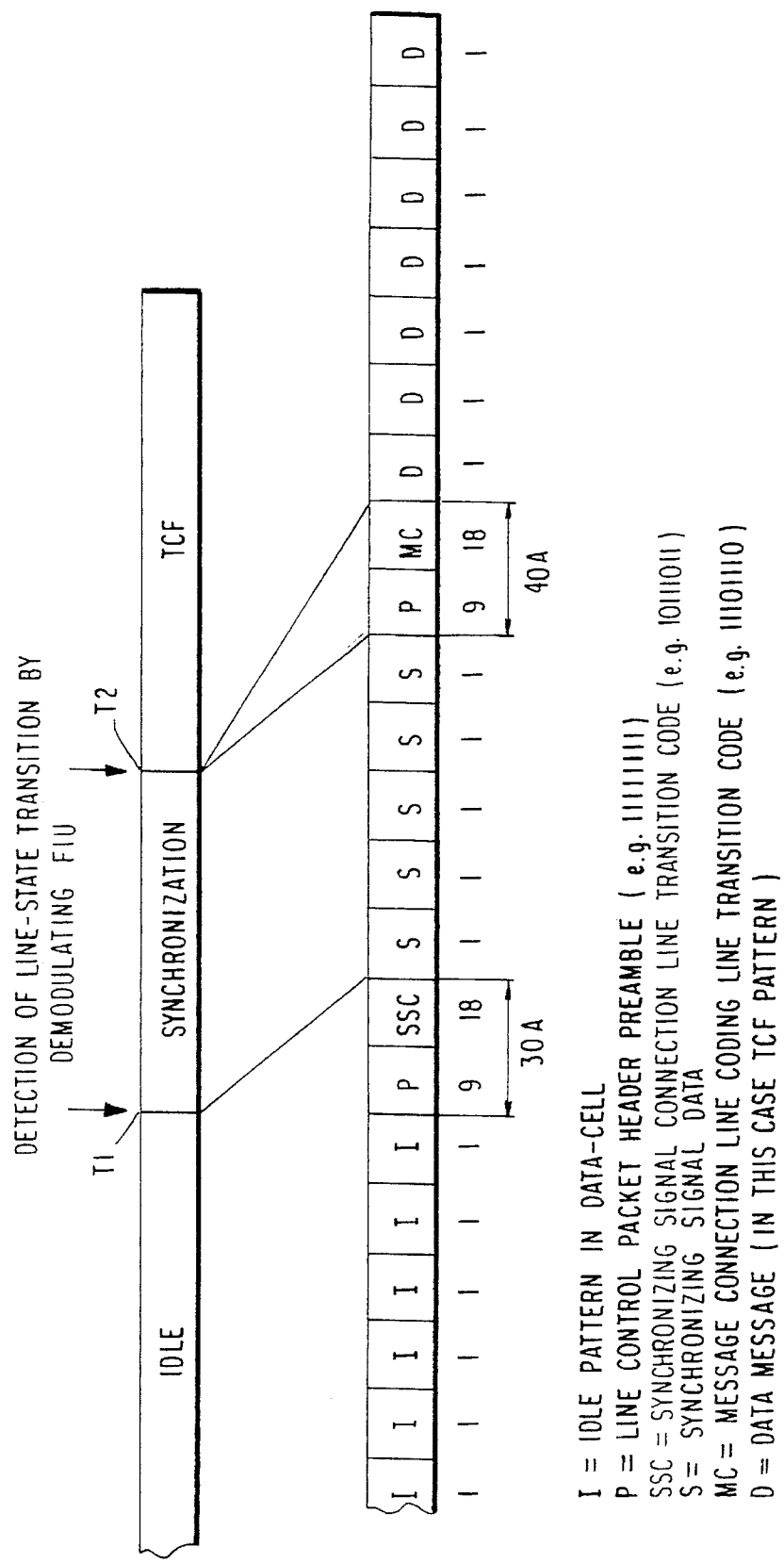
FIG. 3 shows an example of a known line control packet in a data channel.

The protocol used for facsimile signal transmission over the satellite channels is called the "satellite digital facsimile protocol." The FIUs, both at the FES and MET, perform protocol conversion between the satellite digital facsimile protocol and the protocol which is defined in CCITT recommendations T.4 and T.30. The FIUs transmit and receive digital signals to and from the satellite data channel in blocks of a predefined number of X bits. For example, the digital signals may take the form shown in FIG. 2 of U.S. application Ser. No. 07/754,785, which is herein incorporated by reference. In that U.S. application, in example of a 2.4 kbit/s baseband digital channel is shown internally sub-divided into fields and sub-fields so that facsimile user data transmission is conveyed on a burst-mode basis. In the figure, each of the 8-bit data cells is available every 3.33 ms. By internally partitioning the digital channel signals in this manner, accurate time alignment of adjacently transmitted signals can be achieved.

In order to convey the state of voiceband signal types to the distant FIU over the satellite channel, the satellite digital facsimile protocol typically provides line-state indications by means of messages carded as "line control packets," which are transmitted over the data channel. Examples of messages carried within the control packets are:

| Indication | Line State |
| --- | --- |
| Idle: | No signal on the telephone circuit |
| CED Connection: | 2100 Hz Called Station Identification (CED) signal on the telephone circuit |
| Binary Coded Signal Connection: | 300 bit/s (non-preamble) binary coded procedural signal on the telephone circuit |
| Synchronizing Signal Connection: | Modem synchronizing (or training) signal on the telephone circuit |
| Preamble Connection: | 300 bit/s binary coded preamble signal on the telephone circuit |
| Coded Message Connection: | Facsimile message on the telephone circuit |
| TCF Connection: | Training Check (TCF) signal on the telephone circuit |

Line control packets are generated whenever a line state transition occurs and typically proceeds the transmission of information (associated with the new line state) over the digital channel, as discussed above. The indication and the line control packet applies to all associated 8-bit data cells of the satellite channel that immediately follow it until a new line control packet is generated. Hence, these line control packets are used as headers of new information. Because these packets are transmitted in-band over the data channel, they are generated by the demodulating FIU in the FTE-to-satellite direction and removed by the remodulating FIU in the satellite-to-FTE direction. To facilitate recognition of the line control packets, the first bit of the line control packet is always coincident with the data cell boundary.

Figure 5B:
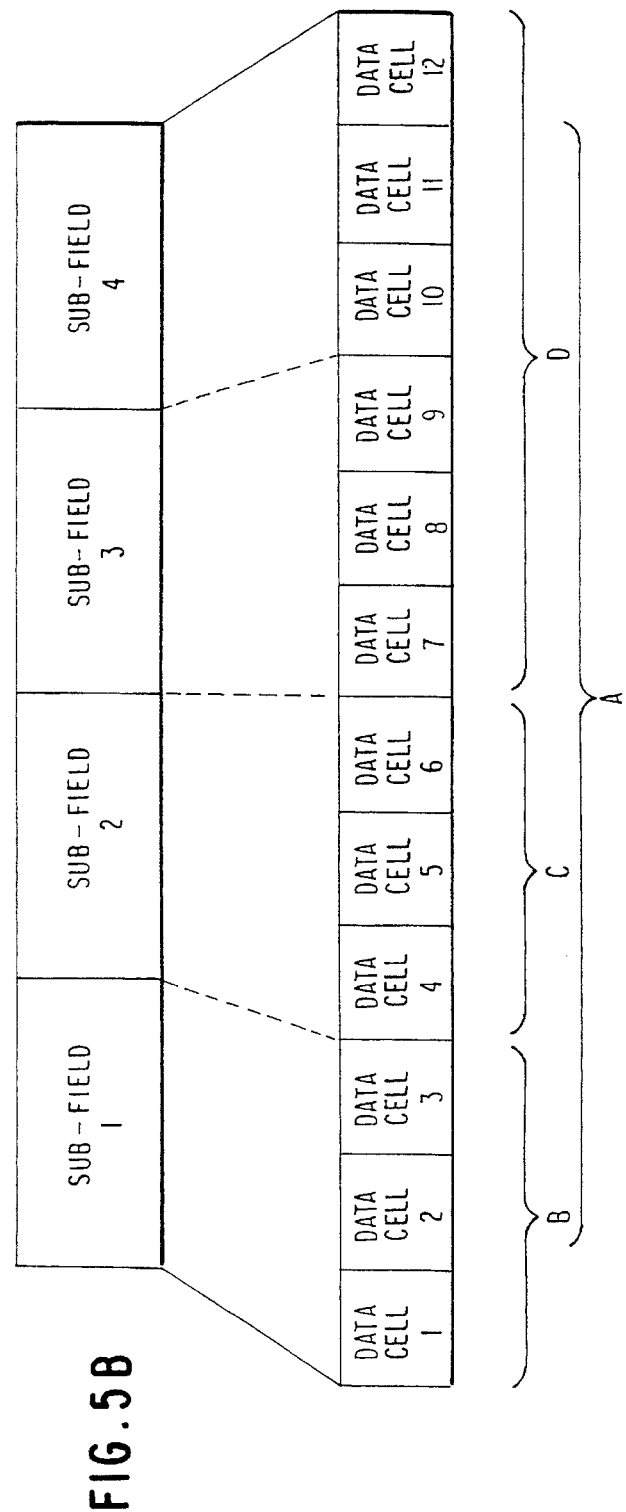
FIGS. 5A and 5B show an example of a special control packet and a unique word code in a data channel in accordance with the present invention.
Figure 5A:
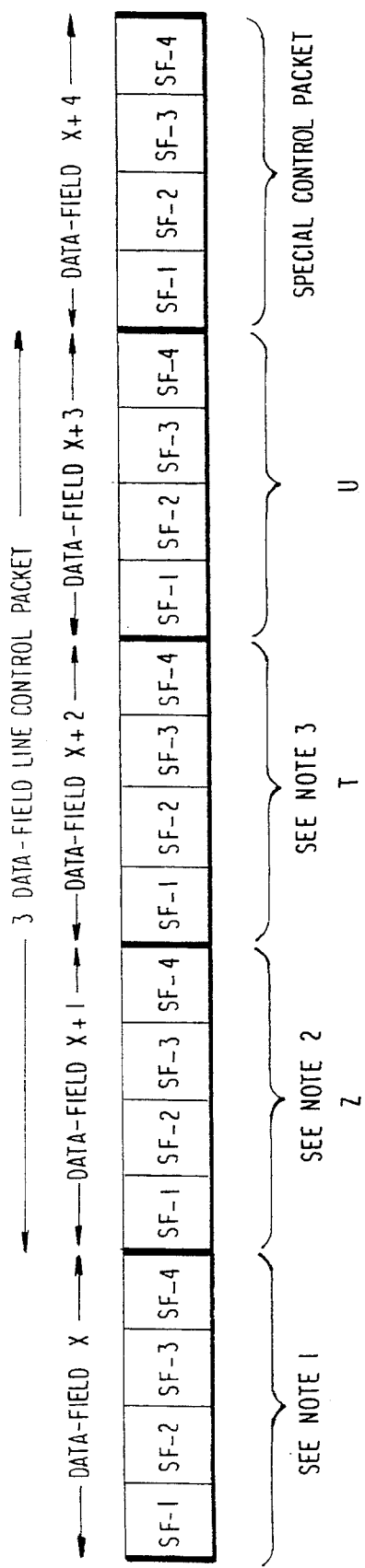

In addition to the line control packets that are generated whenever a line state transition occurs, a special control packet may be used for negotiation of FIU-to-FIU capabilities. As shown in FIGS. 5A and 5B, this special control packet is composed of a total of A (e.g., 12) data cells. The first B (e.g., 3) data cells contain an all "zeros" sequence for use as a special packet preamble to indicate that the following data cells contain FIU compatibility negotiation information. The next C (e.g., 3) data cells contain repetitions of "called FIU special capabilities" control codes (e.g., 4-bit code "0001"). The remaining D (e.g., 6) data cells contain repetitions of capabilities information codes conveying the called FIU capabilities. The capabilities information code may be selected to be of a suitable length (e.g., 8 bits is likely to provide a large capabilities expansion potential).

The special capabilities packet is issued by the called FIU following the transmission of a called station identification code (CED) line control packet. Preferably, the special capabilities packet is inserted in the satellite data channel shortly (e.g., within 120 ms) following the end of the CED line control packet. It is most preferable that the first bit of the special capabilities packet coincide with the first bit of a data field boundary. A data field is assumed to consist of a number of data cells and/or blocks. A data field is also typically associated with the provision of unambiguous timing information from the satellite channel to indicate its start and end. The data field boundary is different from the line control packet's boundary that can typically be inserted at data cells, as well as data field boundaries.

During the negotiation process, the calling FIU may issue a response to the special capabilities control packet shortly after its receipt (e.g., within 200 ms) if compatibility with the special capabilities of the called FIU is found. The response issued by the calling FIU has the same general format as the special capabilities packet output by the called FIU (discussed above). Thus, the response special capabilities control packet is composed of a total of A data cells, wherein the first D data cells contain a sequence of all zeros as a preamble to indicate that the following C data cells contain FIU compatibility agreement information. The C data cells include repetitions of the "calling FIU special capabilities" control code (e.g., a 4-bit code "0010"). The remaining D data cells contain 8-bit capabilities instruction codes conveying the calling FIU agreed upon capabilities.

In the second aspect of the present invention, the line control packets described above are constructed by utilizing a number of data cells as shown in FIG. 5A. The first Z data cells contain a sequence of all "ones," which are used as a line control preamble to indicate that the following T data cells contain line state transition information. The T data cells contain repetitions of an appropriate code (e.g., 4-bit code) for a new line state. The T line control data cells may optionally be followed by W data cells (not shown) containing signal time information which is used by the remodulating FIU to time align adjacent signals.

Under degraded channel conditions, it is possible that a single nibble or byte shift of the user data can take place because of difficulty in determining the exact start and end of the line control packet, particularly when the data is aligned on data cells rather than on a block or a data field boundary. Such a shift can cause total degradation of the signal's content, thereby resulting in the FIUs' inability to track subsequent recovery phases of the T.30 protocol initiated by the end-user facsimile terminals. To minimize the possibility of this occurrence, a set of U data cells are defined which contain predetermined repetitions of a unique binary word which can be employed to precisely align the user data associated with the new line state under degraded channel conditions. The unique word is selected so that it cannot occur in any combination of error-free line control codes.

As described above, the invention is directed to an apparatus for and a method of permitting the in-band negotiation of enhanced capabilities between two or more FIUs in a manner that is backward compatible with communications systems such as INMARSAT's aeronautical and standard-M services. The present invention can also be used for other services, such as AMSC, to provide future expansion of the system functionality. Furthermore, using the unique word code in the line control packet, the communications system performance can be enhanced by improving the control signal and protocol tracking capability in the presence of digital channel impairments.

Having described and illustrated the present invention with preferred embodiments, it will be apparent to those skilled in the art that the invention may be modified in arrangement and detail without departing from the scope and spirit of the invention.

What is claimed is:

1. A facsimile communication system comprising:
   a first facsimile device for providing an analogue voiceband facsimile signal;
   a first processing circuit, connected to receive the facsimile signal from said first facsimile device, for converting the analogue voiceband facsimile signal into a digital code signal representing information carried in the analogue voiceband signal, and for transmitting the digital code signal, and for detecting a type of facsimile signal provided by said first facsimile device and assembling an identification packet containing information identifying the type thus detected, said first processing circuit transmitting the identification packet in-band prior to transmitting the digital code signal;

a second processing circuit, connected to receive the transmitted digital code signal from said first processing circuit, for converting the received digital code signal into an analogue voiceband facsimile signal; and a second facsimile device, connected to receive the analogue voiceband facsimile signal from the second processing circuit, for providing a responsive analogue voiceband facsimile signal;

wherein said second processing circuit detects a type of responsive facsimile signal provided by said second facsimile device and assembles a responsive identification packet containing information identifying the type of signal thus detected, and transmitting the responsive identification packet in-band prior to transmitting the digital code signal, said responsive identification packet including regarding capabilities of said second processing circuit.

2. The facsimile communication system of claim 1, wherein said identification packet includes a unique code appearing at the end of said packet that cannot appear as an error free code in said digital code signal.

3. A method of transmitting facsimile information between facsimile interface units (FIUs) in a facsimile communication system, the method comprising the steps of:

providing an analogue voiceband facsimile signal;

detecting the facsimile signal and transmitting an identification signal corresponding to the type of signal thus detected;

receiving the identification signal thus transmitted and transmitting a responsive identification signal;

converting the analogue voiceband facsimile signal into a digital code signal representing information carried in the analogue voiceband signal;

transmitting the digital code signal; and receiving the transmitted digital code signal and converting the received digital code signal into an analogue voiceband facsimile signal;

wherein said responsive identification signal includes information corresponding to capabilities of an FIU receiving the digital code signal.

4. The method of claim 3, wherein said identification signal includes a unique code appearing at the end of said signal that cannot appear as an error free code in said digital code signal.

5. The facsimile system of claim 1, wherein at least one of said first and second processing circuits is a mobile processing circuit.

6. The facsimile system of claim 2, wherein at least one of said first and second processing circuits is a mobile processing circuit.

7. The facsimile communication system as defined in claim 1, wherein said second processing circuit receives the transmitted digital code signal from said first processing circuit via a satellite.

8. A facsimile communication device comprising:

a facsimile device for providing an analogue voiceband facsimile signal; and a processing circuit, connected to receive the facsimile signal from said facsimile device, for converting the analogue voiceband facsimile signal into a digital code signal representing information carried in the analogue voiceband signal, and for transmitting the digital code signal, and for detecting a type of facsimile signal provided by said facsimile device and assembling an identification packet containing information identifying the type thus detected, said processing circuit transmitting the identification packet in-band prior to transmitting the digital code signal.

9. A facsimile communication device, comprising:

a processing circuit, connected to receive a transmitted digital code signal, for converting the received digital code signal into an analogue voiceband facsimile signal; and a facsimile device, connected to receive the analogue voiceband facsimile signal from the processing circuit, for providing a responsive analogue voiceband facsimile signal;

wherein said processing circuit detects a type of responsive facsimile signal provided by said facsimile device and assembles a responsive identification packet containing information identifying the type of signal thus detected, and transmits the responsive identification packet in-band prior to transmitting the digital code signal, said responsive identification packet including information regarding capabilities of said processing circuit.

* * * * *